UNITED STATES PATENT OFFICE.

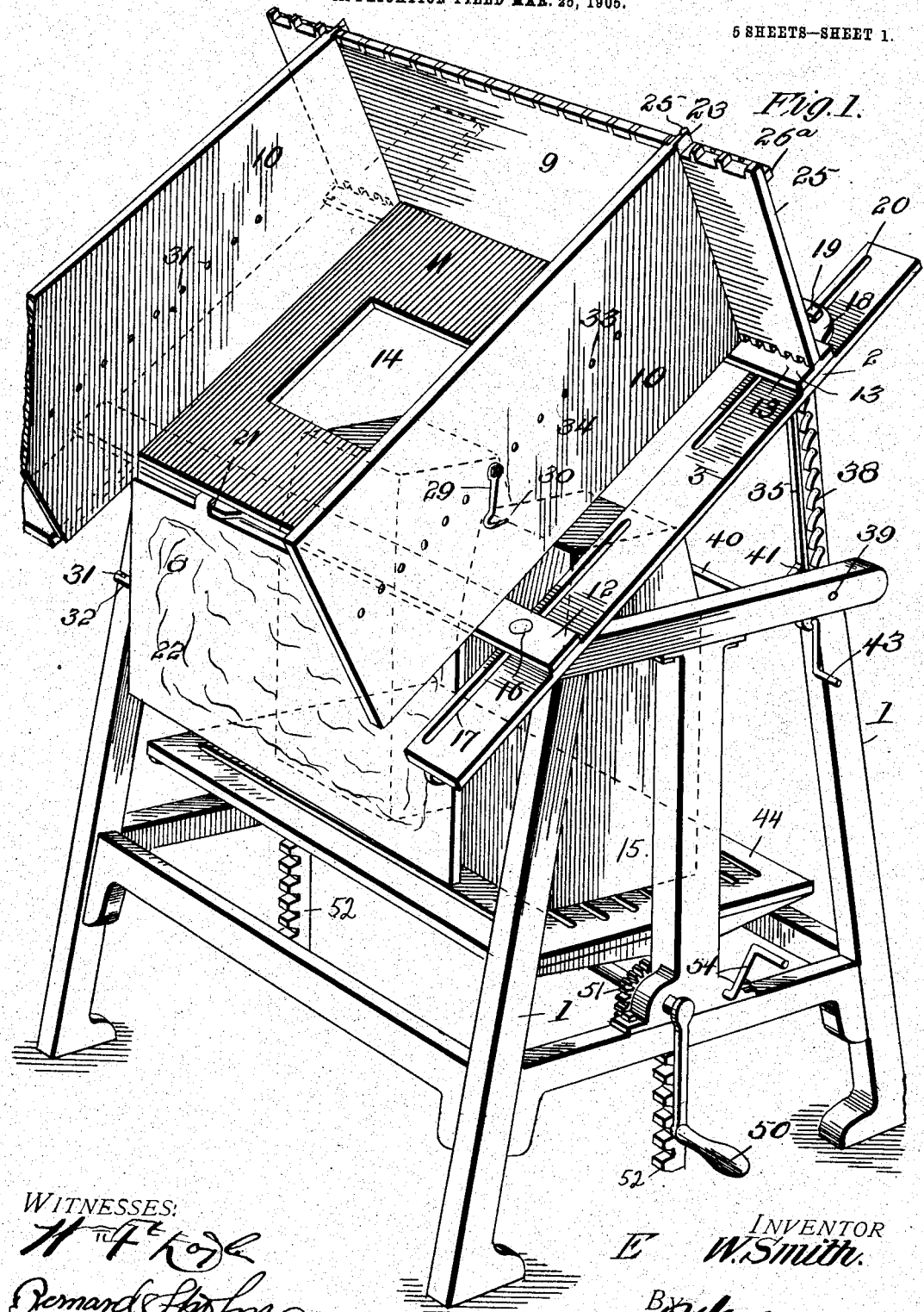

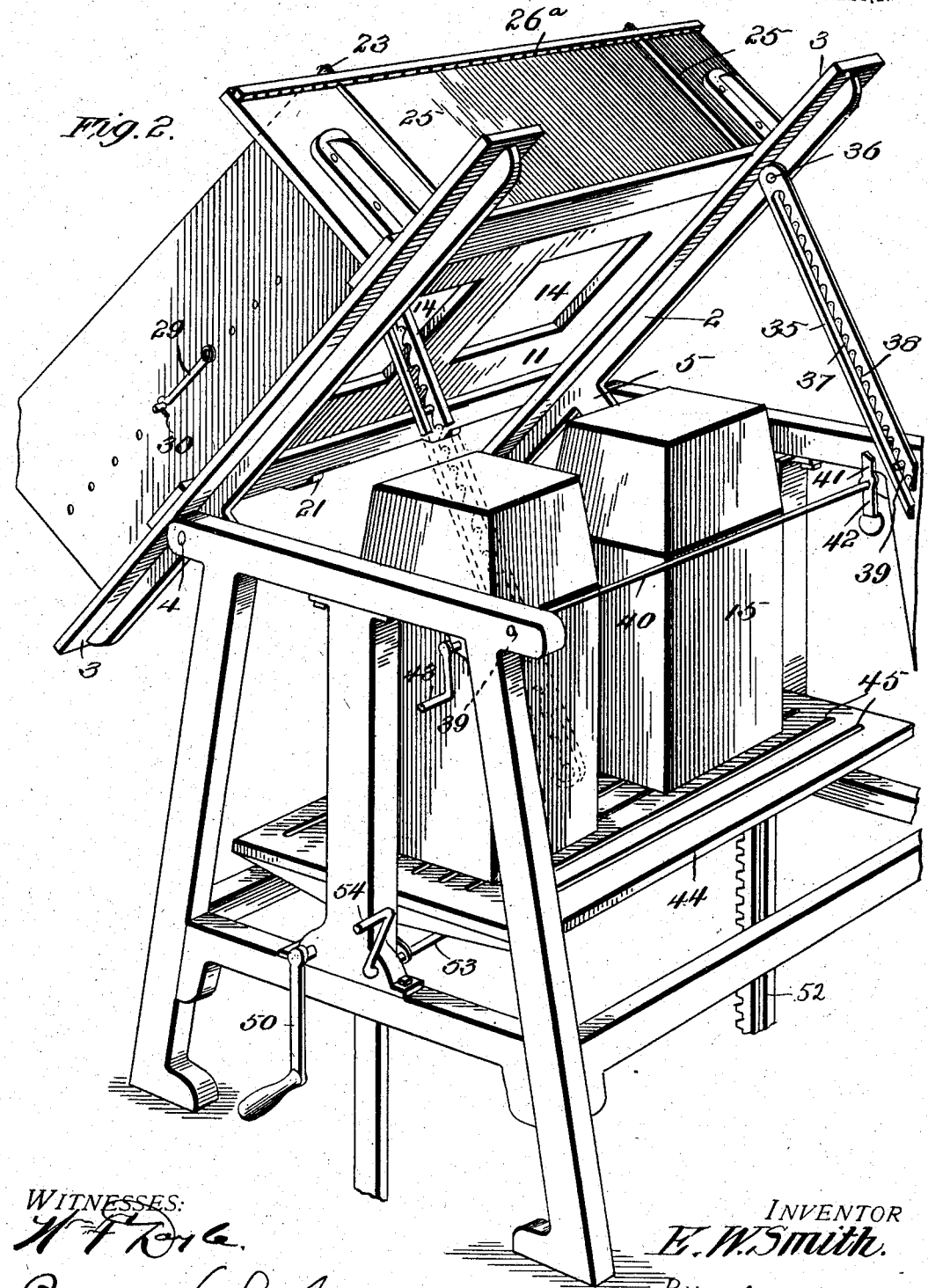

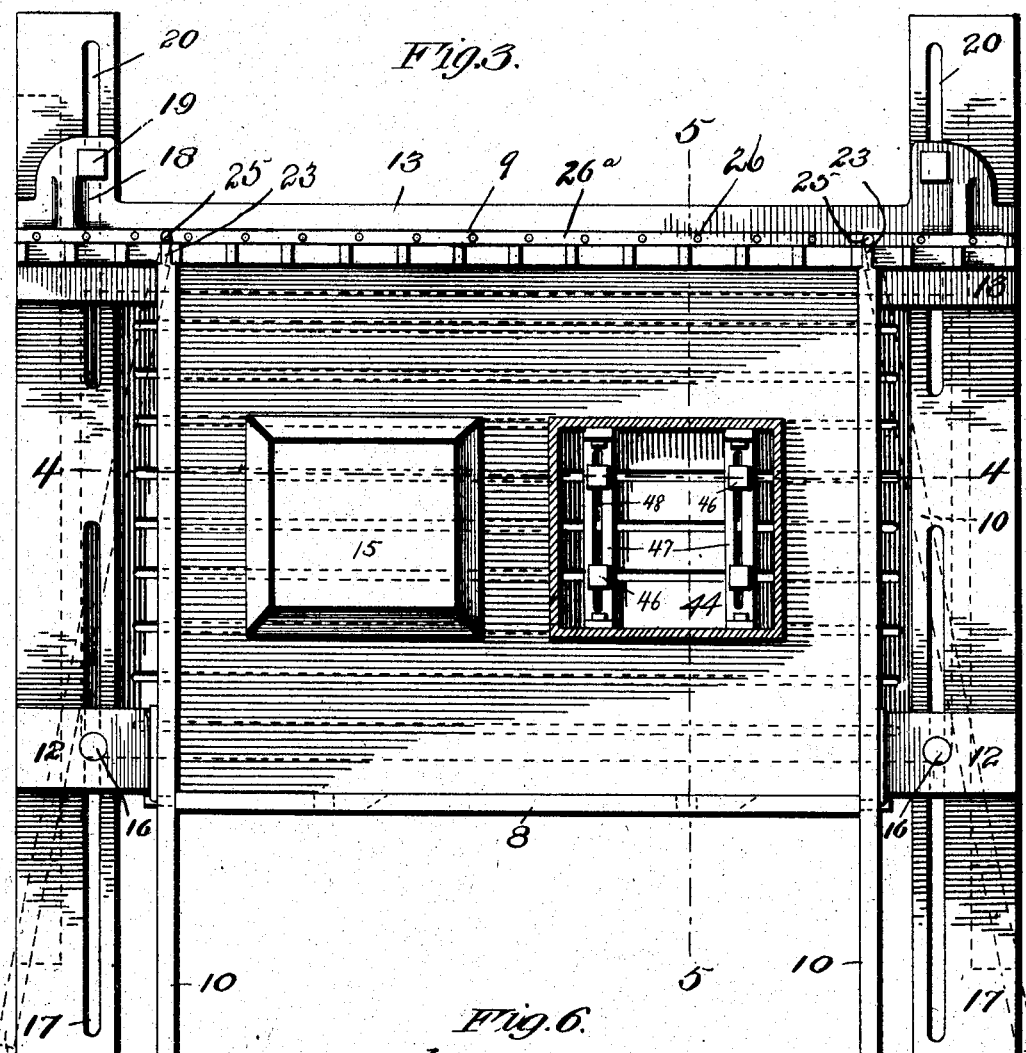

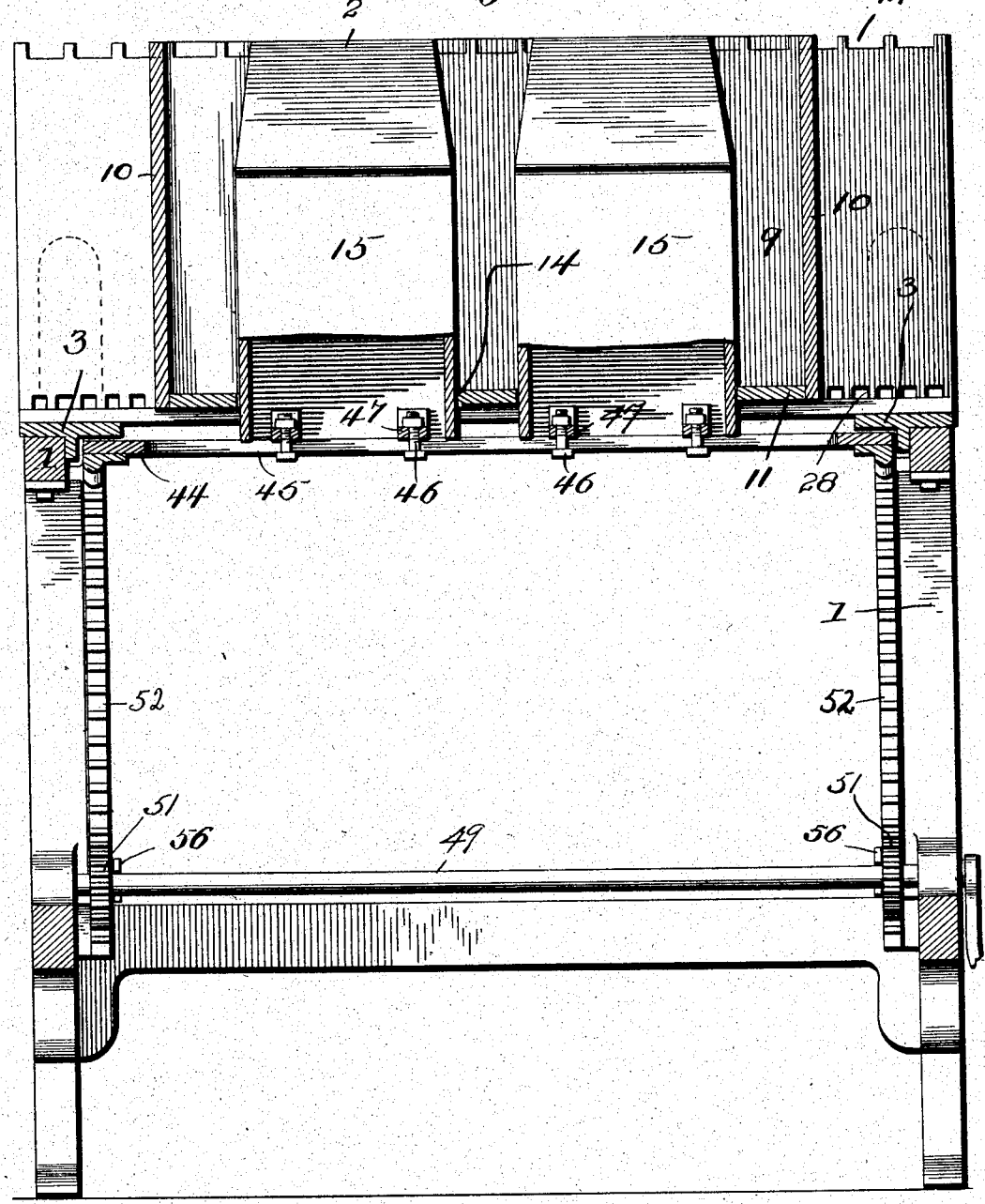

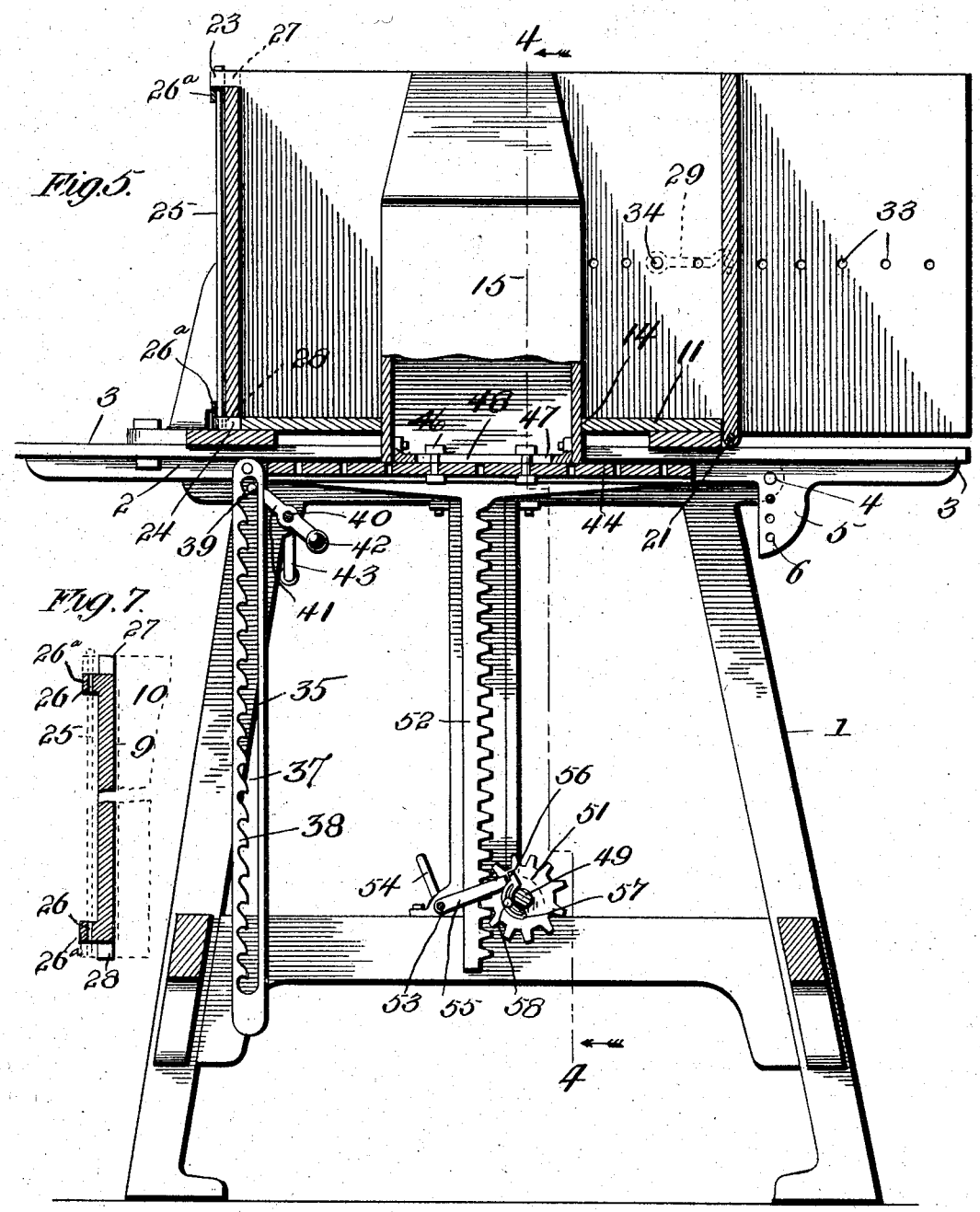

ERNEST W. SMITH, OF HIAWATHA, KANSAS, ASSIGNOR OF ONE-HALF TO HARVEY E. SHUMWAY, OF ST. LOUIS, MISSOURI.

BLOCK-MOLDING MACHINE.

No. 796,021.        Specification of Letters Patent.        Patented Aug. 1, 1905.

Application filed March 25, 1905. Serial No. 251,974.

*To all whom it may concern:*

Be it known that I, ERNEST W. SMITH, a citizen of the United States, residing at Hiawatha, in the county of Brown and State of Kansas, have invented certain new and useful Improvements in Block-Molding Machines, of which the following is a specification.

This invention relates to the art of manufacturing artificial stone, and has special reference to that type of machines designed for the formation of building blocks or tiles made of cement, concrete, or equivalent plastic composition.

To this end the invention contemplates an improved cement-block-molding machine embodying improved means for handling the material and finished product to provide for making various sizes and styles of building-blocks.

In this connection the invention has in view a novel construction of mold-box or mold proper having a wide range of adjustment, adapting the machine for making any size building-block from the size of a brick to a window-sill and simply requiring the interchange of separate design and bottom plates, according to the design and character of the block to be molded.

A further object is to provide an adjustable mold-box or mold proper wherein not only a wide range of adjustment is provided for varying the width or length of the block, but also permitting an arrangement of parts which provides for varying the depth of the product to be molded.

The invention also has in view a novel manner of handling the mold-box or mold proper to facilitate the starting of the molded article to prepare the design or pattern-face thereof before working up and developing the main body portion of the article with a different grade of material, should such a method be desirable and preferable.

Another object of the invention is to provide an improved adjustable mold-box wherein any size or style of core may be employed and different sizes and shapes of design and bottom plates utilized, according to the character of the block or tile being manufactured.

Another object of the invention is to provide a novel manner of manipulating the core or cores to provide for their projection into the mold-box and their withdrawal therefrom after the cement body has been shaped therein.

With these and other objects in view, which will more readily appear as the nature of the invention is better understood, the same consists in the novel construction, combination, and arrangement of parts, which will be hereinafter more fully described, illustrated, and claimed.

The essential features of the invention involved in carrying out the objects above indicated are necessarily susceptible to structural modification without departing from the scope of the invention; but a preferred embodiment of the latter is shown in the accompanying drawings, in which—

Figure 1 is a perspective view of the cement-block-molding machine constructed in accordance with the present invention and showing the mold-box opened up to expose all of the parts thereof. Fig. 2 is a similar view of the machine from the rear thereof. Fig. 3 is a top plan view of the machine, showing the mold-box closed. Fig. 4 is a vertical longitudinal sectional view of the machine on the line 4 4 of Fig. 3 with the tilting molding-table lowered and showing the core-carrying bed elevated. Fig. 5 is a vertical transverse sectional view on line 5 5 of Fig. 3 with the core carrier or carrying-bed lowered. Fig. 6 is a diagrammatic plan view showing a modification in the construction of an adjustable mold-box. Fig. 7 is an enlarged detail sectional view showing more plainly the preferred adjustable hinge connection for the rear ends of the adjustable and swinging end walls of the mold-box.

Like reference-numerals designate corresponding parts in the several figures of the drawings.

In carrying out the present invention the mold-box or mold proper is associated with a main supporting-stand 1, essentially consisting of a skeleton framework of sufficient strength to provide for properly supporting the working parts of the machine and designed for holding on top thereof at proper working elevation a vertically-swinging tilting molding-table 2, upon which are directly mounted the various parts of the adjustable mold-box or mold proper.

The tilting molding-table 2 preferably consists of a skeleton rectangular frame preferably composed of the opposite parallel side bars 3, suitably connected and braced together to provide a sufficiently strong frame to support the adjustable members of the mold-box. At what may be termed the "front ends" of the side bars 3 of the frame 2 the said side bars have a hinge connection 4 with the upper front side of the supporting-stand 1. This hinge connection 4 may be any suitable pivotal connection between the front edge of the frame 2 and the front edge of the stand 1; but an advantageous hinge-mounting is shown in the drawings and consists in providing the frame side bars 3 contiguous to their front ends with pendent hinge-lugs 5, having therein a series of adjustment-holes 6 receiving the hinge pin or bolt 4. This construction provides means for varying the plane of the hinge-support for the tilting molding-table should that be found necessary or desirable.

The mold-box or mold proper which is supported on and carried by the tilting molding-table 2 essentially consists of the front and rear side walls 8 and 9, respectively, and the opposite adjustable folding end walls 10, which when in assembled relation with reference to the oppositely-disposed front and rear side walls 8 and 9 provide a complete mold-box within which the cement or composition material is tamped to form the building block or stone. In addition to the related side and end walls 8, 9, and 10 the mold-box may be properly said to include as a part thereof a removable bottom plate 11, which is designed to be arranged wholly within the plane of the side and end walls when in their closed relation and to detachably rest upon the adjustable base-bars 12 and 13, which constitute the adjustable base-support for the front and rear side walls 8 and 9, respectively. Hence the removable bottom plate 11, constitutes the removable bottom of the mold upon which the molded block or article is removed after the mold is opened up, and by reason of this mounting of the bottom plate 11 it will be readily understood that various sizes of bottom plates may be utilized, according to the size of the block to be molded. The different bottom plates which are designed to be thus interchanged are provided therein with any number and arrangement of core-receiving openings 14, through which are designed to be projected and withdrawn the vertically-movable core-blocks 15, which will be presently referred to in connection with the means for handling the same.

Referring more particularly to the detailed construction of the mold-box and the adjustable parts thereof, it is to be observed that the adjustable base-bar or base-support 12 for the front side wall 8 is arranged across the tilting molding-table 2 as one of the bracing members thereof, and the opposite ends of the said base bar or support 12 receive therein the adjustment-bolts 16, designed to adjustably work in the slots 17, formed in the front end portions of the frame side bars 3, thus providing means for adjusting the front side wall 8 in a direction toward and from the rear side wall 9, which has a corresponding adjustment. This corresponding adjustment for the rear side wall is accomplished by mounting the said rear side wall directly upon the adjustable base bar or support 13 and preferably equipping the latter with suitable fastening-brackets 18, accommodating the adjustable securing-bolts 19, which are adapted to be secured in adjustment holes or slots 20, formed longitudinally in the frame side bars 3 of the tilting molding-table. This corresponding adjustment for both the front and rear side walls 8 and 9 provides means for effecting a wide range of adjustment in the direction of the width of the block to be molded, thus adapting the machine for various widths of building-block or tiles.

In connection with the mounting of the front side wall 8 it is preferable that this wall be hinged at its lower edge, as at 21, to the front edge of the base-support 12 therefor, so that the said front side wall may be folded outward and downward to provide for opening up the mold-box for facilitating the removal of the molded article upon the bottom plate 11. Also the folding front side wall is usually utilized as the design-plate for the mold. To this end the same is provided upon its inner face with a design or pattern surface 22, of any desired design or pattern, although it may be noted at this point that in making corner-blocks within the mold the end plates are provided with a desired pattern or design. However, irrespective of utilizing either the front side walls or the end walls as the design-plates, the adjustment and use of these members in the mold-box always remain the same.

While the lateral adjustment of the front and rear side walls 8 and 9 provides for a width adjustment of the mold-box, a depth adjustment may be provided for by placing suitable spacing-blocks beneath the removable bottom plate 11, and the length adjustment for varying the length of the mold-box or mold proper is accomplished through the mounting of the opposite folding end walls 10. Each of the folding end walls 10 is provided at what may be termed the "rear end" thereof with the upper and lower hinge-lugs 23 and 24, respectively, which are arranged in vertical alinement and are designed to receive a detachable hinge-bolt 25, mounted in any of a series of vertically-disposed bolt-receiving openings 26, formed in cleats $26^a$ at one side of the rear side wall 9 of the mold-box. A number of the vertically-disposed bolt-receiving openings 26 are pivoted on or in the wall 9, so that by the individual adjustment of the hinge-bolt 25 for each of the end walls 10 a wide range of adjustment is provided for such walls in a direction toward and from each other, thus effecting any desired adjustment in the length of the mold, according to the length of the article to be molded. It is preferable to provide countersinks or notches 27 and 28, respectively, at the top and bottom edge of wall 9, contiguous to the bolt-receiving openings 26. The countersinks or recesses 27 and 28 for those openings 26 which are not in use are designed to be preferably filled by suitable filling-blocks, although the lower countersinks or recesses 28 when not occupied are covered by the back edge of the removable bottom plate 11.

When the end walls 10 are swung inward to their closed position and the folding front wall 8 is swung to its upright position, the several walls of the mold are held together in this closed relation through the medium of suitable fastenings, preferably consisting of hinged fastening-hooks 29, having wedge-shaped points 30, adapted to engage in eyes 31, provided at the outer ends with holding-pins 32, fitted to and projecting from the ends of the folding front wall 8, said holding-pins 32 adapted to extend through any of a series of keeper-holes 33, formed in a longitudinal series in the opposite folding walls 10. A series of keeper-holes 33 is provided in order to compensate for the adjustment of the front wall 8 toward and from the rear wall 9. The said keeper-walls 33 also constitute adjustment-holes to adjustably receive the hinge-bolts 34 for securing the fastening-hooks 29 in position. In connection with this fastening it is also preferable to plug or fill those keeper-holes 33 which are not in use when the mold-box is adjusted for a particular size.

The tilting molding-table 2, which is swung on the hinges 4, is designed to be supported in its raised or tilted position through the medium of a pair of pivotal holding-braces 35. These holding-braces 35 are pivoted at their upper ends, as at 36, to the side bars 3 of the molding-table and are provided with longitudinally-disposed guiding-slots 37, at one edge of which slots the braces 35 are formed with a series of ratchet-teeth 38, adapted to engage with and ride over a fixed supporting element 39, which may be in the form of a rod extending entirely across the top of the stand 1 or may consist of separate fixed pins for each of the braces 35. When the tilting molding-table is raised from its horizontal to its elevated inclined position, the ratchets 38 of the braces 35 freely ride over the fixed elements 39 and automatically engage with said elements to hold the table tilted until the operator is ready to lower the table to provide for completing the molding of the block. To effect the release of the braces 35 to permit the lowering of the molding-table 2, there is employed a releasing device, preferably consisting of a rock-shaft 40, journaled in bearings at the top of the supporting-stand 1 and carrying oppositely-located rocker-release dogs 41, rigidly supported on the shaft 40 and weighted at one end, as at 42, to normally fall out of engagement with the brace 35.

The shaft 40 is provided at one or both ends with an operating-crank 43, which when moved in one direction provides for carrying one end of the release-dogs 41 against the supported ends of the brace 35, thereby carrying the ratchets of said brace out of engagement with the fixed supporting element 39 and holding the braces in position so that they will freely ride down over the element 39 as the table is lowered to its horizontal at-rest position upon the top of the supporting-stand 1.

The core-blocks 15 correspond in shape, number, and arrangement to the core-receiving openings 14, provided in the removable bottom plate 11 of the mold-box, and said core-blocks are carried by a vertically-movable core-carrier 44. This core-carrier 44 is in the form of a rising-and-falling bed provided therein with a plurality of longitudinally-arranged adjustment-slots 45, adapted to adjustably receive therein the fastening-bolts 46, mounted in the holding-bars 47, arranged transversely within and across the body of the core-block. The holding-bars 47 of each core-block are provided with longitudinally-disposed slots 48, which in conjunction with the slots 45 of the carrying-bed 44, provide for a wide range and nicety of adjustment for each core-block to adapt the same perfectly to any conditions required in the adjustment and manipulation of the machine.

The raising and lowering of the vertically-movable core carrier or bed 44 is accomplished through the medium of a suitable raising and lowering device preferably consisting of an operating-shaft 49, journaled in suitable bearings provided at the ends of the main supporting-stand 1 of the machine and provided at one or both ends with an operating-crank 50, which is grasped by the operator to provide for raising and lowering the core-carrier. In addition to the operating-shaft 49 the raising and lowering device for the rising-and-falling core carrier or bed includes a pair of oppositely-located gear-wheels 51 and a pair of oppositely-arranged pendent rack-bars 52, rigidly secured to the under side of the carrier or bed 44 and normally meshing with the teeth of the gear-wheels 51, so that by the turning of the shaft 49 provision is made for positively and conveniently raising and lowering the core-carrier, with the cores 15 thereon, to provide for thrusting such cores through the openings in the mold-bottom and also for withdrawing the cores after the article has been shaped and allowed to become sufficiently set to permit withdrawal of the cores.

When the core carrier or bed 44 is raised to its elevated position, it is necessary to provide means for securing it in such position. To this end a holding device is employed, said holding device consisting of a rock-shaft 53, journaled in suitable bearings on the machine-stand and provided at one or both ends with a controlling crank or handle 54 and carrying rocker catch-dogs 55, the free ends of which dogs are adapted to be moved into interfering relation to stop members 56, mounted directly on one side of the gear-wheels 51. These stop members 56 are provided with curved slotted-arm portions 57, receiving binding-screws 58, which provide for fastening said arms in their adjusted positions. This construction permits of a circular adjustment for the stop members 56 to provide means whereby it may be determined accurately in what position the core-carrier bed will be located. The catch-dogs 55 do not interfere with the raising of the core carrier or bed 44, inasmuch as during this operation the stop members 56 trip beneath and past the free ends of the dogs, and a tendency of the gears to rotate in a reverse direction is arrested by a direct engagement of the stop members 56 with the ends of the dogs 55, as may be plainly seen from Fig. 5 of the drawings.

Various modifications of the structure described may be resorted to without departing from the scope of the invention. One of these modifications is suggested in Fig. 6 of the drawings, which illustrates a modified construction of the mold or mold-box to adapt the mold for shaping elongated articles—such, for instance, as cement window-sills, curb-blocks, and the like. In this modification all of the essential features of the invention are preserved, including the tiltable molding-table 2, the back wall 9, and the end walls 10; but in order to provide for the extra length of the back wall, the same has fitted thereto a detachable lapped joint, as at 9$^a$. A front board 8$^a$ may be utilized in this modification for facing up the front side of the object, and extra supporting means may be employed for bracing the extended portions of the molding-table beyond the main supporting-stand. These details, however, are obvious mechanical expedients that may or may not be resorted to without affecting the essential features of the suggested modification.

It is thought that the method of manipulating the herein-described machine will be readily understood from the foregoing description; but it may be briefly noted at this point that to provide for molding a building-block or other article the molding-table is swung to its raised tilted position and the various parts of the mold-box thrown open into the positions shown in Fig. 1 of the drawings. The folding front side wall is then brought up into position and the two end walls closed against the ends of said front wall and secured thereto through the medium of the fastening devices already described. The detachable bottom plate of the mold is then placed in position within the box formed by the front and rear side walls and the opposite end walls, after which a layer of pure cement is preferably spread over the surface 22 of the wall carrying such surface. Then the tilting molding-table is lowered to its horizontal position and the raising and lowering device operated to provide for bringing the cores up through the openings in the bottom-plate. With the parts thus positioned the mixture of sand and cement is then placed within the mold-box, and after being thoroughly tamped the surplus on the top is taken off by a long trowel with straight edge. When this operation has been completed, the cores are withdrawn from the mold, and when the plastic body has set sufficiently the fastenings for the end walls are released to permit such walls to swing outward and the front wall or design-plate to swing outward. The complete block or stone is then removed by lifting the bottom-plate out of the mold-box and carrying the same away to any convenient point where the block or stone is to remain until thoroughly dry. Another bottom-plate is positioned on the molding-table and the operation described repeated.

Various modifications other than the one described may be resorted to without departing from the scope of the invention.

Having thus described the invention, what is claimed, and desired to be secured by Letters Patent, is—

1. In a block-molding machine, the mold-box comprising an adjustable relatively fixed wall, a folding side wall arranged opposite the relatively fixed wall, and laterally-swinging end walls having an adjustable connection with the relatively fixed wall, and a separable connection with the folding side wall.

2. In a block-molding machine, the mold-box comprising a shiftable rear wall, a shiftable folding front wall, shiftable end walls having adjustable hinge connections with the rear wall, and adjustable fastening connections with the folding front wall.

3. In a block-molding machine, the mold-box comprising a rear wall, a folding front wall, laterally-swinging end walls hinged to the rear wall, and shiftable fastenings for the front wall carried by said end walls.

4. In a block-molding machine, the mold-box comprising opposite side walls adjustable toward and from each other, laterally-swinging end walls having hinge connections with one of the side walls and adjustable toward and from each other, and shiftable fastenings adjustably mounted on the end walls and coöperating with one of the side walls in any of its adjusted positions.

5. In a block-molding machine, the mold-box comprising oppositely-arranged side walls adjustable toward and from each other, one of said side walls having a hinge mounting and provided at its ends with holding-pins, laterally-swinging end walls having a hinge connection with the relatively fixed side wall and provided with a series of keeper-holes receiving the holding-pins for the side wall, and fastenings shiftably mounted on the end walls and coöperating with said holding-pins in any adjusted position of the side wall which carries the same.

6. In a block-molding machine, the mold-box proper comprising a rear wall, a vertically-swinging hinged front wall arranged opposite said rear wall, laterally-swinging end walls having hinge members, hinge-bolts mounted on the rear wall and fitted to the hinge members of said end walls, the hinge-bolts for the opposite end walls being adjustably mounted upon the rear wall to permit shifting thereof toward and from each other, and fastenings mounted upon the end walls and arranged to secure the front wall in its upright position.

7. In a block-molding machine, a table, the molding-box mounted upon the table and comprising a relatively fixed wall shiftably mounted upon the table, a vertically-swinging hinge-wall also shiftably mounted upon the table, and provided with a pattern-surface, and laterally-swinging end walls having adjustable hinge connections with the relatively fixed wall, and separable fastening connections with said vertically-swinging wall.

8. In a block-molding machine, a table and a mold-box mounted upon the table and comprising front and rear adjustable base-bars shiftably mounted upon the table, a relatively fixed rear wall rigidly mounted upon the rear base-bar, a vertically-swinging front wall hinged to the front adjustable base-bar, laterally-swinging end walls having adjustable hinge connections at one end with the rear wall, separable fastening connections to the vertically-swinging wall, and a removable bottom mounted on the base-bars inside of the plane of the mold-walls.

9. In a block-molding machine, a fixed stand, a rising-and-falling core-carrier mounted on the fixed stand, a tiltable molding-table mounted on the fixed stand, and a mold-box carried by the table.

10. In a block-molding machine, a fixed stand, a tiltable molding-table mounted on the fixed stand, means for adjusting and supporting the tiltable table, and a mold-box carried by said table.

11. In a block-molding machine, a fixed stand, an adjustable frame constituting a molding-table and arranged for tilting movement on the fixed stand, and a mold-box carried by said table.

12. In a block-molding machine, a fixed stand, an angularly-adjustable molding-table having a hinge-support at one edge upon the fixed stand, and a mold-box carried by said table.

13. In a block-molding machine, a fixed stand, an angularly-adjustable molding-table having a hinge-support at one edge upon the fixed stand, and a mold-box carried entirely by the molding-table and having a vertically-swinging drop side wall located at the hinged edge of the molding-table and provided with a pattern-surface.

14. In a block-molding machine, a stand, a vertically-swinging tilting molding-table having a hinge mounting at one edge upon the stand, a mold-box carried by the table, and a holding device connected with the table and comprising means for holding it at various inclinations.

15. In a block-molding machine, a stand, a vertically-swinging molding-table hinged at one edge upon the stand, a fixed supporting element or elements carried by the stand, holding-braces having pivotal connection at one end with the molding-table and provided with slotted ratchet portions engaging with the fixed supporting element or elements of the stand, and a releasing device mounted upon the stand, and comprising suitably-operated rock-shaft and rocker-release dogs carried by said shaft and adapted to be moved against said braces to disengage the ratchet-teeth thereof and permit the lowering of the molding-table.

16. In a block-molding machine, a stand, a vertically-swinging molding-table hinged to the stand and carrying the mold-box, pivotal holding-braces connected with the molding-table and having a ratchet-catch engagement with the stand, and a releasing device mounted on the stand and adapted to disengage the holding-braces.

17. In a block-molding machine, the stand, the mold-box having a bottom provided with core-receiving openings, a rising-and-falling core-carrier bed sustaining the core-carrying blocks thereon, said bed having pendent rack-bars, an operating-shaft carrying gear-wheels meshing with said rack-bars, circularly-adjustable stop members mounted upon said gear-wheels, and a holding device comprising a suitably-adjusted rock-shaft, and catch-dogs carried by said shaft and adapted to be moved into and out of the path of said stop members on the gear-wheels.

18. In a block-molding machine, the stand, the mold-box having a bottom provided with core-receiving openings, a rising-and-falling core-carrying bed, and a core block or blocks having a detachable connection with said bed and adjustable both longitudinally and transversely thereof without removing the connections between the core-block and the bed.

19. In a block-molding machine, the combination with the mold-box of a rising-and-falling core-carrying bed provided with a series of longitudinally-arranged adjustment-slots, a core block or blocks provided with longitudinally-slotted holding-bars disposed transversely of the longitudinal slots of the bed, and fastening-bolts engaging said holding-bars and also the slotted portions of the bed.

In testimony whereof I affix my signature in presence of two witnesses.

ERNEST W. SMITH.

Witnesses:
   G. W. DUERSER,
   W. BAYLOR.